April 29, 1969 R. S. TVETER 3,441,886

ROTARY TRANSFORMER WITH INTEGRAL BEARING

Filed March 2, 1967

INVENTOR:
RICHARD S. TVETER
BY
Dawson, Tilton, Fallon, Lungmus & Alexander
ATT'YS United States Patent Office 3,441,886
Patented Apr. 29, 1969

3,441,886
ROTARY TRANSFORMER WITH
INTEGRAL BEARING
Richard S. Tveter, Glenview, Ill., assignor to
Sidney Himmelstein, Chicago, Ill.
Filed Mar. 2, 1967, Ser. No. 620,144
Int. Cl. H01f 21/04, 21/06; H02k 5/16
U.S. Cl. 336—120    10 Claims

ABSTRACT OF THE DISCLOSURE

An easily assembled rotary transformer in which the critical clearance between the rotor and the stator is accurately maintained. The stator is supported by the rotor rather than by the transformer frame. The stator includes a cylindrical coil form and associated coil ensleeved about the rotor. The stator further includes a pair of hemi-cylindrical stator cores (which enclose the stator coil and rotor) and which are locked together. Adjacent surfaces of the stator and rotor are bearing surfaces so that the rotor may rotate within the stator without the necessity of an independent mounting for the stator.

Background of the invention

For any given rotary transformer configuration the clearance between the rotor core and stator core is critical because it affects the electrical characteristics of the transformer. In general, the smaller the clearance, the more desirable the electrical performance. In order to maintain these small clearances, many close tolerance parts are required to mount the rotor and stator cores. In contemporary rotary transformer design, the stator structure mounts and locates the stator cores, stator windings, and also the rotor bearings. The rotor cores and windings are attached to and located on a shaft that is journaled in the rotor bearings. Thus, the clearance between rotor and stator must be sufficient to prevent collisions or rubbing between the rotor cores and stator cores and also provide for tolerances in the supporting structure and the bearings. Any misalignment of the rotor shaft in the rotor bearings or dimensional changes due to temperature or the like affects the critical clearance and causes a corresponding change in the electrical characteristics of the transformer.

Summary of the invention

In the inventive transformer the rotor and stator are so constructed that no supporting structure is required for mounting and locating the stator core. Closer clearances between the rotor and stator are possible and much of the normally required stator supporting structure may be eliminated. When the stator core is mounted in place, the stator coil and core assembly positions itself both radially and axially about the rotor core. The only clearance between the rotor and stator is that necessary for good bearing fit. No provision in the clearances needs to be made for tolerances of rotor and stator structure. The critical clearance between the rotor and stator is maintained relatively constant, thereby providing relatively stable electrical characteristics.

Description of preferred embodiment

Figure 1:
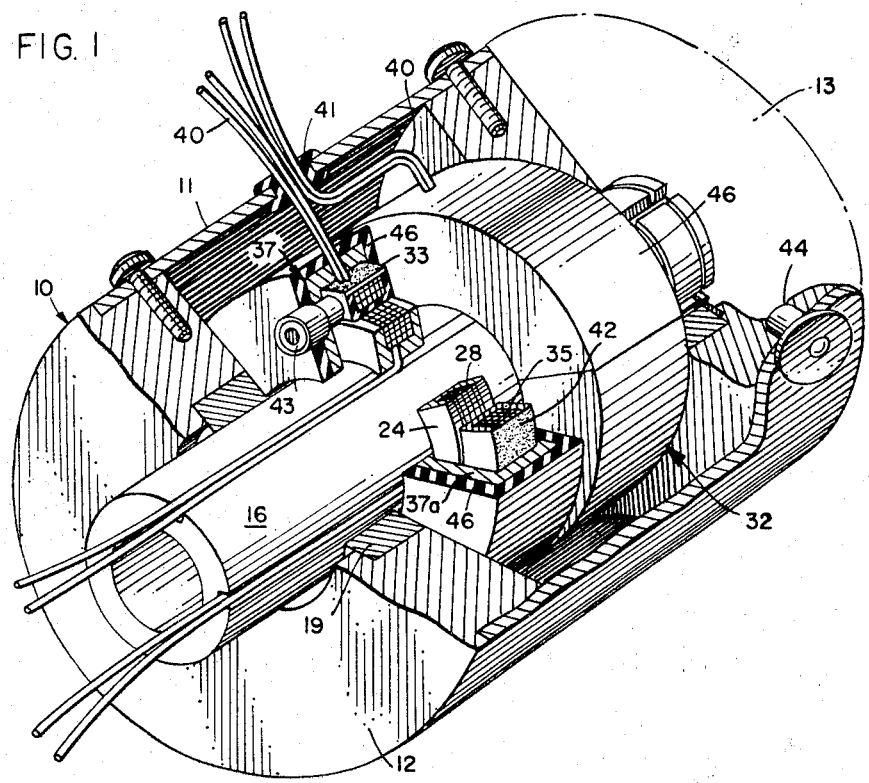
FIG. 1 is a perspective view partially broken away of the inventive transformer.
Figure 2:
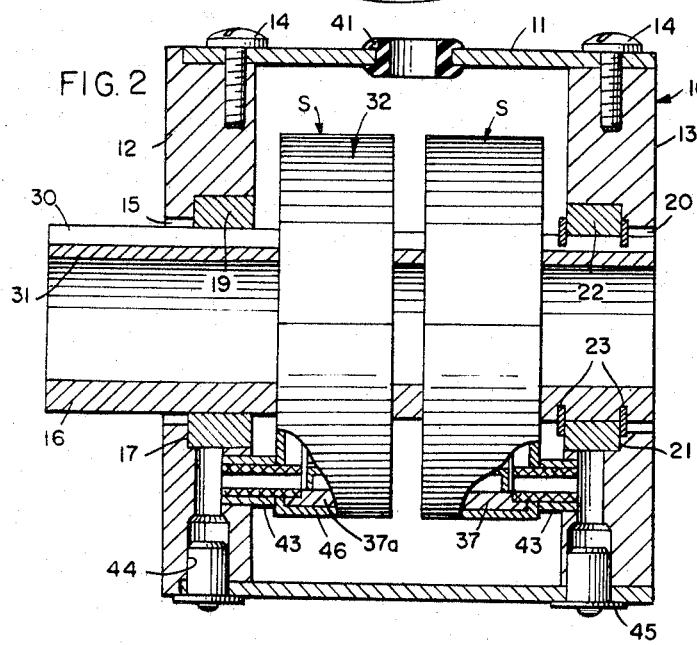
FIG. 2 is an elevational sectional view of the transformer.

Referring now to FIGS. 1 and 2 the numeral 10 designates generally a rotary transformer embodying the features of this invention. Although the particular transformer illustrated is a two channel transformer i.e., a transformer having two transformer sections S, it is to be understood that the invention is equally applicable to transformers having a single transformer section as well as transformers having a plurality of transformer sections. The transformer includes a cylindrical housing 11 and end closures 12 and 13 secured to housing 11 by screws 14. End closure 12 is apertured as at 15 for the receipt of rotor shaft 16 and recessed as at 17 to receive bearing 19. In the illustration given, bearing 19 is a circular bearing which may advantageously be bronze or nylon, and shaft 16 may be aluminum. Similarly, end closure 13 is provided with aperture 20, which receives rotor shaft 16, and recess 21, of which receives bearing 22. Keys 23 extending radially outwardly from rotor shaft 16 adjacent the sides of bearing 22 serve to prevent axial movement of rotor shaft 16.

Figure 3:
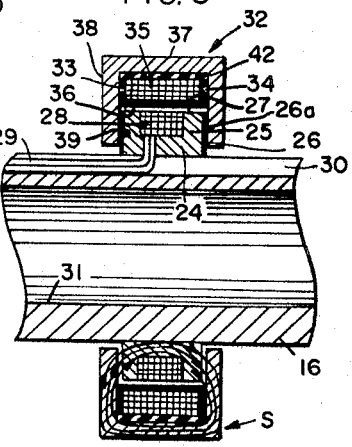
FIG. 3 is a sectional view showing the relationship between the stator and rotor.

Referring now to FIG. 3, each transformer section S includes an annular rotor core 24 which is mounted on shaft 16. Rotor core 24 is seen to be generally U-shaped in cross section and includes radially extending sides 25. The axially outside surfaces of rotor core 24 which extend transversely to rotor shaft 16 are suitably machined to provide a bearing surface as at 26. If desired the bearing surface 26 may be coated or covered with a suitable bearing material 26a such as nylon or Teflon (tetrafluoroethylene polymer). The axially extending, radially outer surfaces of rotor core 24 are also machined to provide a bearing surface as at 27. Rotor coil 28 is circumferentially wound about rotor core 24 between the radially extending sides 25 thereon. The rotor coil leads 29 pass through a hole provided in the rotor core and are carried in an axially extending groove 30 provided in the surface of rotor shaft 16. Alternatively, the rotor coil leads 29 may also be brought radially into and withdrawn through a central bore 31 provided in the rotor shaft.

The stator assembly generally designated 32 encircles the rotor and is received thereon. Stator assembly 32 includes an annular stator coil form 33 which preferably includes outwardly radially extending sides 34. Stator coil 35 is circumferentially wound within stator coil form 33 between stator coil form sides 34. The inner surface 36 of stator coil form 33 provides a mating bearing surface for the axially extending surface 27 of the rotor core, and for this purpose, the stator coil form may advantageously be made of nylon.

Embracing both the stator coil and the rotor is a stator core 37, which includes radially inwardly extending sides 38. The innermost portion of stator core sides 38 overlap rotor core sides 25, and the inside surfaces 39 of these portions of the stator core are machined to provide bearing surfaces which mate with bearing surfaces 26 of the rotor core. As can be seen in FIG. 1, stator leads 40 pass through an opening provided in the stator core and extending outwardly from the transformer housing 11 through a rubber grommet 41 which is secured in an opening provided in the housing.

Stator core 37 is divided into two mating hemi-cylindrical segments 37a (FIGS. 1 and 2) so that the stator core is easily positioned about the rotor and stator coil after the stator coil has been ensleeved about the rotor.

When the mating stator core segments 37a are mounted in place, the stator coil and core will position itself both radially and axially about the rotor core 24. The only clearance between the rotor and stator is that necessary for good bearing fit. As mentioned previously, no provision in the clearance needs to be made for tolerances of rotor and stator structure. Because the stator "rides" on the rotor the clearance between the two remains essentially constant despite changes in the dimensions or alignment of the rotor shaft. Thus, the air-gap reluctance between the stator and rotor is maintained constant, and the electrical characteristics of the transformer will also remain substantially constant.

The mating stator cores segment 37a and the stator coil may be held together either by a suitable retaining clip (not shown) extending about the stator core hemi-cylinders or by adhesively securing the stator core segments to the stator coil and coil form as by a layer of cement 42 (FIG. 3). To prevent the stator core and coil from tending to rotate and straining the stator coil leads, a tube 43 (FIG. 2) is inserted into a suitable opening provided in one of the stator hemi-cylinders 37a. The other end of tube 43 is received in one of the end closures 12, 13 of the transformer.

To provide lubricant to the bearing surfaces of the rotor and stator and to the rotor bearings, lubricant ports 44 may be drilled in the end closures. These ports communicate with tubes 43 and also direct lubricant to rotor bearings 19 and 22. Fitted in the ends of lubricant ports 44 are closure caps 45. If desired, a protective epoxy coating 46 (FIG. 1) may be applied to the outer surface of the stator core 37.

It has been found that ferrite rotor and stator cores have desirable electrical properties and are also readily machinable to provide the necessary bearing surfaces.

In one embodiment of the invention the diameter of the rotor shaft 16 was 0.749 inch. The rotor core 24 had an inside diameter of 0.765 inch and an outside diameter of 1.120 inches. The axial width of the rotor core was 0.281 inch and the distance between the sides 25 of the core was 0.156 inch. The rotor core sides 25 extended radially outwardly for a distance of 0.1 inch from the axially extending portion of the rotor core. Stator core segments 37a had an outside radius of $^{47}/_{64}$ inches and an inside radius of 0.390 inch. The axial width of the stator core was $^{7}/_{16}$ inch, and the distance between the stator core sides 38 was 0.284 inch. Stator coil form 33 had an inside diameter of 1.123 inches and an outside diameter of 1.326 inches. The axial width of the stator coil form was 0.278 inch, and the distance between coil form sides 34 was 0.218 inch.

While in the foregoing specification, a detailed description of the invention was set forth for the purpose of illustration, many of the details hereingiven may be varied considerably by those skilled in the art without departing from the spirit and scope of the invention.

I claim:

1. In a rotary transformer for use with a rotary shaft, said transformer having an annular rotor coil and an annular stator coil, structure comprising:

rotor support means coaxially fixedly mounted on the rotary shaft carrying said rotor coil, and having an annular bearing portion;

stator support means extending coaxially about said rotor support means, carrying said stator coil and having an annular bearing portion rotatably fitted on said rotor support means bearing portion, and means for preventing rotation of said stator support means about said rotor support means, whereby said stator support means is effectively coaxially journalled on said rotor support means.

2. The rotary transformer structure of claim 1 wherein said rotor support means includes a side bearing surface and said structure includes a stator support means embracing said rotor support means and including a side bearing surface confronting said rotor support means side bearing surface and cooperatively defining therewith an axial thrust bearing means.

3. The rotary transformer structure of claim 1 wherein said bearing portion of said rotor support means is formed of ferrite material.

4. The rotary transformer structure of claim 3 wherein the side bearing portions of said rotor and stator support means are formed of ferrite material.

5. The rotary transformer structure of claim 1 wherein said means for preventing rotation of said stator support means further defines means for conducting lubricant to said rotor and stator support means bearing portions.

6. The rotary transformer structure of claim 1 further including means for lubricating said bearing portions.

7. The rotary transformer structure of claim 1 wherein said stator support means include a plurality of core segments arranged to define an annular core and adhesive means securing said segments to said stator coil.

8. The rotary transformer structure of claim 1 wherein said stator support means include an annular coil form carrying said stator coil, a plurality of core segments arranged to define an annular core and adhesive means securing said segments to said stator coil and to said coil form.

9. The rotary transformer structure of claim 2 wherein at least one of said side bearing portions comprises a planar surface defined by a plastic covering.

10. The rotary transformer structure of claim 1 wherein the bearing portion of said rotor support means has a radially outer annular surface defining said bearing portion thereof and said stator support means has a radially inner annular surface defining the bearing portion thereof.

References Cited

UNITED STATES PATENTS

| | | | |
|---|---|---|---|
| 2,432,982 | 12/1947 | Braddon et al. | 336—123 XR |
| 2,615,069 | 10/1952 | Gallagher | 310—90 XR |
| 2,983,832 | 5/1961 | Macks | 310—90 |
| 3,016,273 | 1/1962 | Benoit | 310—90 |
| 3,159,907 | 12/1964 | Bloom | 336—198 XR |
| 3,302,048 | 1/1967 | Gray | 310—90 |
| 3,317,873 | 5/1967 | Himmelstein et al. | 336—123 XR |

LEWIS H. MYERS, *Primary Examiner.*

T. J. KOZMA, *Assistant Examiner.*

U.S. Cl. X.R.

310—90; 336—123